(12) United States Patent
Newman

(10) Patent No.: US 9,250,322 B2
(45) Date of Patent: Feb. 2, 2016

(54) SIGNAL PROCESSING METHODS AND APPARATUS

(75) Inventor: Mike Newman, Reading (GB)

(73) Assignee: Thales Holdings UK Plc, Surrey (GB)

( * ) Notice: Subject to any disclaimer, the term of this patent is extended or adjusted under 35 U.S.C. 154(b) by 609 days.

(21) Appl. No.: 13/525,175

(22) Filed: Jun. 15, 2012

(65) Prior Publication Data

US 2013/0009806 A1    Jan. 10, 2013

(30) Foreign Application Priority Data

Jun. 17, 2011  (GB) .................................. 1110363.7

(51) Int. Cl.
*G01S 13/00* (2006.01)
*G01S 13/90* (2006.01)
*G01S 13/28* (2006.01)

(52) U.S. Cl.
CPC ........... *G01S 13/9011* (2013.01); *G01S 13/282* (2013.01); *G01S 13/9035* (2013.01)

(58) Field of Classification Search
CPC .................................................. G01S 13/9035
USPC ....................................................... 342/25 A
See application file for complete search history.

(56) References Cited

U.S. PATENT DOCUMENTS

| | | | |
|---|---|---|---|
| 2,678,997 A * | 5/1954 | Darlington | ..................... 375/285 |
| 3,720,950 A * | 3/1973 | Vehrs, Jr. | ....................... 342/162 |
| 3,815,409 A * | 6/1974 | Macovski | ........................ 73/615 |
| 5,351,053 A * | 9/1994 | Wicks et al. | ................... 342/158 |
| 5,546,085 A | 8/1996 | Garnaat et al. | |
| 5,812,082 A | 9/1998 | Moreira et al. | |
| 6,222,933 B1 * | 4/2001 | Mittermayer et al. | ........ 382/109 |
| 6,624,783 B1 * | 9/2003 | Rabideau | ....................... 342/195 |
| 2003/0133496 A1 * | 7/2003 | Hooton | ......................... 375/139 |
| 2003/0149361 A1 | 8/2003 | Miwa et al. | |

FOREIGN PATENT DOCUMENTS

JP    61124881 A    6/1986
JP    5341036 A    12/1993

OTHER PUBLICATIONS

Search Report for British Application No. GB1110363.7.
European Search Report dated Sep. 9, 2012.
W. G. Carrara et al., "Spotlight Synthetic Aperture Radar: Signal Processing Algorithms," Jul. 1, 1995, pp. 401, 428-429, and 440, Artech Print on Demand, Boston.

(Continued)

*Primary Examiner* — Frank J McGue
(74) *Attorney, Agent, or Firm* — Hauptman Ham, LLP

(57) ABSTRACT

A signal processor performs a signal transform of a signal, and comprises a signal demodulator for demodulating said signal by a first chirp signal having a first chirp rate to obtain a reduced bandwidth chirped signal, a filter for filtering the reduced bandwidth chirped signal and delaying the reduced bandwidth chirped signal by an interval proportional to a reciprocal of said first chirp rate, a signal modulator for modulating said filtered signal by a second chirp signal having a second chirp rate to obtain an increased bandwidth chirped signal and to provide a time domain output spectrum of said signal, and wherein each of said first chirp signal and said second chirp signal is a complex signal representing a linear frequency modulated chirp.

18 Claims, 9 Drawing Sheets

(56) References Cited

OTHER PUBLICATIONS

August Golden, Jr. et al., "Migration processing of spotlight SAR data," 1994, pp. 25-35, vol. 2230, Environmental Research Institute of Michigan, Ann Arbor, MI.

C. Prati et al., "Spot mode SAR focusing with the w-k technique," in Proceedings of the 1991 IEEE International Geoscience and Remote Sensing Symposium (IGARSS), 1991, pp. 631-634, Dipartimento di Elettronica—Politecnico di Milano, Milano, Italy.

* cited by examiner

US 9,250,322 B2

SIGNAL PROCESSING METHODS AND APPARATUS

RELATED APPLICATIONS

The present application is based on, and claims priority from, British Application Number 1110363.7, filed on Jun. 17, 2011, the disclosure of which is hereby incorporated by reference herein in its entirety.

FIELD

Embodiments described herein relate generally to signal processing and, more particularly, to a method of processing a signal in a radar system.

BACKGROUND

Synthetic aperture radar (SAR) has been an important tool for remote sensing. The SAR is essentially an active imaging device capable of gathering information relating to phases of reflected signals of a radar beam to form images. The phase of the reflected signals vary approximately quadratically such that the received signal comprises the sum of a number of, approximately linear, chirped signals. The instantaneous bandwidth of a signal is much less than the total bandwidth of the signal.

In spotlight SAR, a radar (mostly airborne) travels along a trajectory while the radar antenna is directed at a fixed region on the ground, forming a "synthetic aperture"—the spatial interval over which data is collected.

Generally, SAR algorithms can be divided into two classes, namely SAR algorithms that remove the quadratic component of the phase variation and SAR algorithms that retain it. Algorithms that remove (dechirp) the quadratic component utilise focusing approximation which would limit the maximum size scene that can be imaged at high resolutions. Algorithms that do not dechirp the data are required to sample the signal fully to avoid aliasing. The higher sampling rate required vastly increases the amount of data to be processed resulting in a corresponding increase in the processing requirements.

Range Migration Algorithm (RMA) is representative of a class of SAR algorithms that uses the actual spherical wave to increase the image quality. The RMA is known as having low processing per pixel and using approximations that are accurate for large high-resolution images. The RMA can perform large-area imaging without breaking a scene into smaller sub-images, and produces well-focused, fine resolution images over a wider area scene.

A feature of RMA is that data are processed using an along-track Fourier transform. As the size of the aperture increases, the bandwidth of the signal to be transformed increases while the instantaneous bandwidth of the signal remains approximately constant.

It is noted that one of the requirements of the conventional along-track Fourier transform is that the data needs to be fully sampled, i.e. the sampling frequency being higher than the signal bandwidth. In order to achieve this, up-sampling of the data is required in cases where the signal bandwidth exceeds the PRF, or down-sampling is limited in cases where the signal bandwidth is significantly larger than the instantaneous bandwidth.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
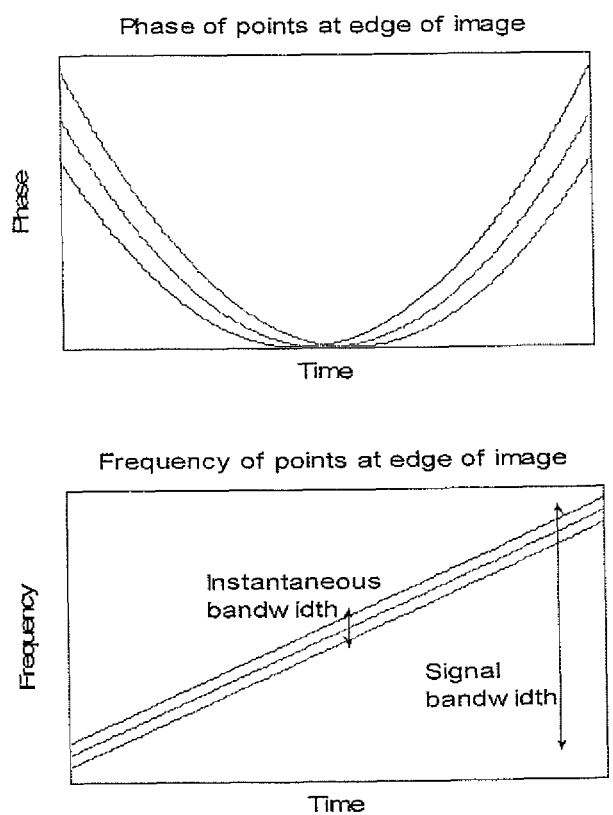
FIG. 1 illustrates phase and frequency points at the centre and two edges of a SAR image.

FIG. 1 shows, by way of illustration, approximately quadratic phase and corresponding linear frequency variation for reflectors in different parts of an imaged scene. As noted above, the instantaneous bandwidth of the signal is much less than the total bandwidth of the signal.

An embodiment described herein provides a signal processor for performing a signal transform of a signal, the signal processor comprising a signal demodulator for demodulating said signal by a first chirp signal having a first chirp rate to obtain a reduced bandwidth chirped signal, a filter for filtering the reduced bandwidth chirped signal and delaying the reduced bandwidth chirped signal by an interval proportional to a reciprocal of said first chirp rate, a signal modulator for modulating said filtered signal by a second chirp signal having a second chirp rate to obtain an increased bandwidth chirped signal and to provide a time domain output spectrum of said signal, and wherein each of said first chirp signal and said second chirp signal is a complex signal representing a linear frequency modulated chirp.

The filter may include a Fourier transform means for transforming the reduced bandwidth chirped signal into a frequency spectrum.

The filter may further include a further signal modulator for modulating said frequency spectrum and generating a further modulated output signal.

The filter may further include an inverse Fourier transform means for generating an inverse Fourier transform of said further modulated output signal.

The first chirp rate and the second chirp rate may be equal.

A second embodiment described herein provides a radar system for acquiring a synthetic aperture image, said radar system comprising, a receiver for receiving a radar signal including a two-dimensional array of data comprising down-range data and along-track data, wherein said along-track data includes at least one along-track chirp signal, a processor for processing said received radar signal, said processor includes a signal processor according to the above aspect, a signal bandwidth reduction means for reducing the bandwidths of said down-range frequency spectra data and said along-track frequency spectra data, a Stolt interpolator for interpolating said reduced bandwidth frequency spectra data to generate interpolated data, and wherein said processor is further operable to perform a two-dimensional inverse Fourier transformation of the interpolated data to generate an output image.

A third embodiment described herein provides a method of performing a signal transform of a signal, the method comprising demodulating said signal by a first chirp signal having a first chirp rate to obtain a reduced bandwidth chirped signal, filtering the reduced bandwidth chirped signal and delaying the reduced bandwidth chirped signal by an interval proportional to a reciprocal of said first chirp rate, modulating said filtered signal by a second chirp signal having a second chirp rate to obtain an increased bandwidth chirped signal and to provide a time domain output spectrum of said signal, and wherein each of said first chirp signal and said second chirp signal is a complex signal representing a linear frequency modulated chirp.

The step of filtering may include performing a Fourier transform to transform the reduced bandwidth chirped signal into a frequency spectrum.

The step of filtering may further include modulating said frequency spectrum to generate a further modulated output signal.

The step of filtering may further include performing an inverse Fourier transform to generate an inverse Fourier transform of said further modulated output signal.

The first chirp rate and the second chirp rate may be equal.

A fourth embodiment described herein provides a method for acquiring a synthetic aperture image, said method system comprising receiving a radar signal including a two-dimensional array of data comprising down-range data and along-track data, wherein said along-track data includes at least one along-track chirp signal, processing said received radar signal according to the steps of the above aspect, reducing the bandwidths of said down-range frequency spectra data and said along-track frequency spectra data, interpolating said reduced bandwidth frequency spectra data to generate interpolated data, performing a two-dimensional inverse Fourier transformation of the interpolated data to generate an output image.

A fifth embodiment described herein provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The above embodiments can be incorporated into a specific hardware device, a general purpose device configure by suitable software, or a combination of both. The embodiments can be implemented in a software product, either as a complete software implementation, or as an add-on component for modification or enhancement of existing software (such as, as a plug in). Such a software product could be embodied in a carrier medium, such as a storage medium (e.g. an optical disk or a mass storage memory such as a FLASH memory) or a signal medium (such as a download). Specific hardware devices suitable for implementing an embodiment such as described above could include an application specific device such as an ASIC, an FPGA or a DSP, or other dedicated functional hardware means. The reader will understand that none of the foregoing discussion of embodiments in software or hardware limits future implementation of described embodiments on yet to be discovered or defined means of execution.

Specific embodiments will be described in further detail on the basis of the appended figures. It will be appreciated that this is by way of example only, and should not be viewed as presenting any limitation on the scope of protection sought.

Figure 2:
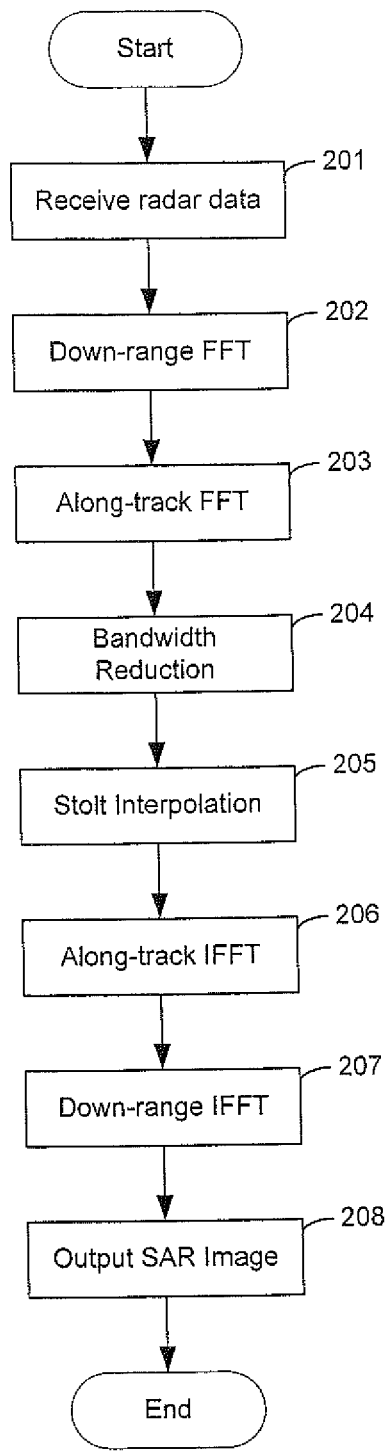
FIG. 2 illustrates a flow diagram of a process of acquiring a SAR image using a conventional RMA algorithm.

A flow diagram representation of a conventional RMA is illustrated in FIG. 2. Referring to FIG. 2, the process begins with receiving a set of radar data at step 201. Down-range FFT is then carried out on the received data at step 202. An along-track FFT is performed at step 203. The bandwidth of the frequency domain signal is then reduced at step 204. A one-dimensional interpolation, known as Stolt interpolation, is performed at block 205. Finally, a two dimensional IFFT (along-track IFFT at step 206 and down-range IFFT at step 207 is performed to obtain an output SAR image (step 208).

Figure 3:
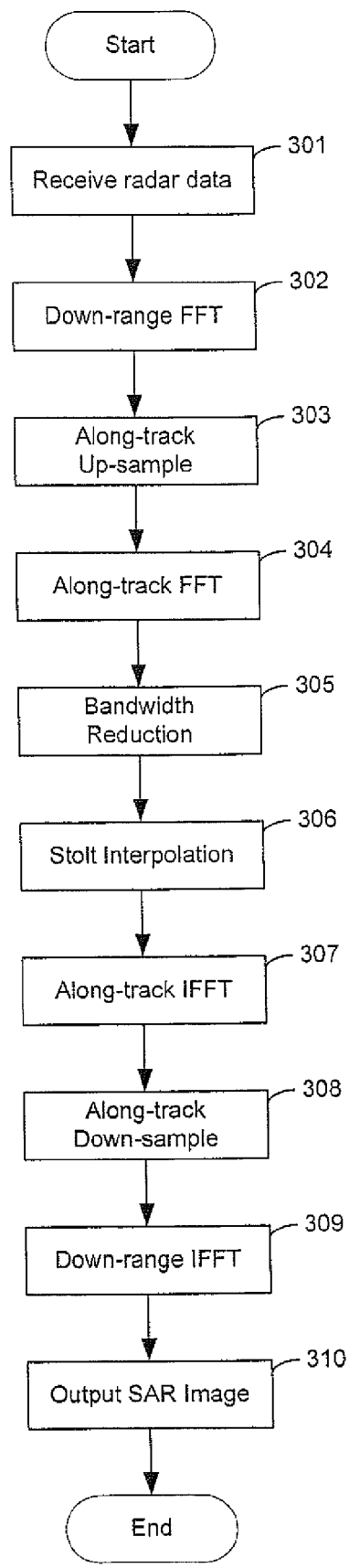
FIG. 3 illustrates a flow diagram of a process of acquiring a SAR image using a conventional RMA algorithm with along-track up-sampling.

In process data suitable for forming a higher resolution image, up-sampling of the along-track data may be performed. As shown in FIG. 3, the process begins with receiving a set of radar data at step 301. Down-range FFT is then carried out on the received data at step 302. Along-track up-sampling is performed at step 303 to increase the sampling rate of the along-track data. An along-track FFT is performed at step 304. The bandwidth of the frequency domain signal is then reduced at step 305. A one-dimensional interpolation, known as Stolt interpolation, is performed at block 306. One dimensional along-track IFFT is performed at step 307 and along-track down-sampling is performed at step 308. Finally, a down-range IFFT is performed at step 309 to obtain an output SAR image (step 310). Clearly, a disadvantage of performing the along-track up-sampling is that it also increases the processing requirements and data storage.

In one embodiment, a method is provided of performing the along-track FFT that produces high resolution images without increasing the processing requirements of the system.

Figure 4:
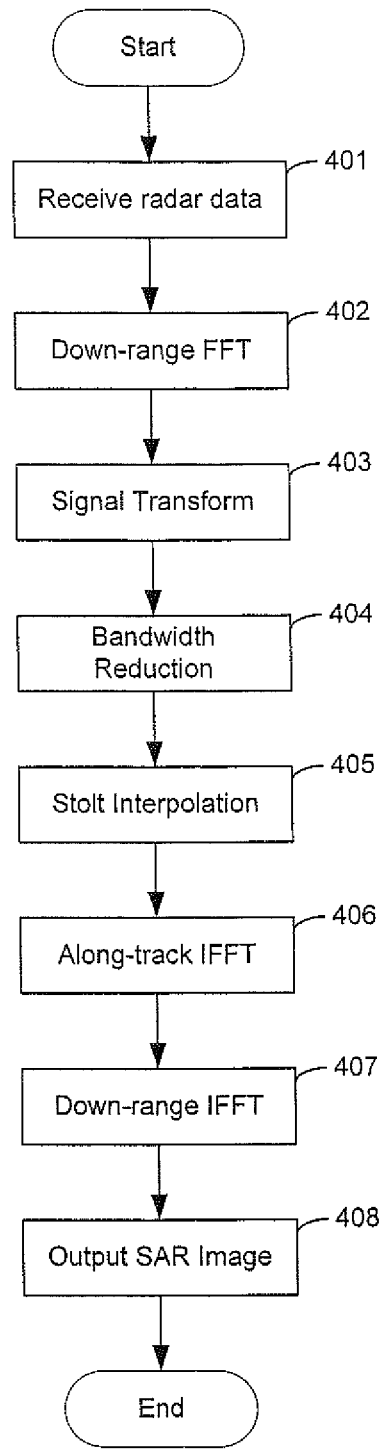
FIG. 4 illustrates a flow diagram of a process of acquiring a SAR image according to an embodiment described herein.

As shown in FIG. 4, the along-track FFT in a conventional RMA is replaced by a signal transform which is capable of reducing the bandwidth of the signal. Consequently, the required sample rate is also reduced.

Referring to the flow diagram of FIG. 4, the process begins with receiving a set of radar data at step 401. Down-range FFT is carried out on the received data at step 402. A signal transform operation is performed at step 403. The bandwidth of the frequency domain signal is then reduced at step 404. The Stolt interpolation is performed at block 405. Finally, a two dimensional IFFT (along-track IFFT at step 406 and down-range IFFT at step 407) is performed to obtain an output SAR image (step 408).

Figure 5:
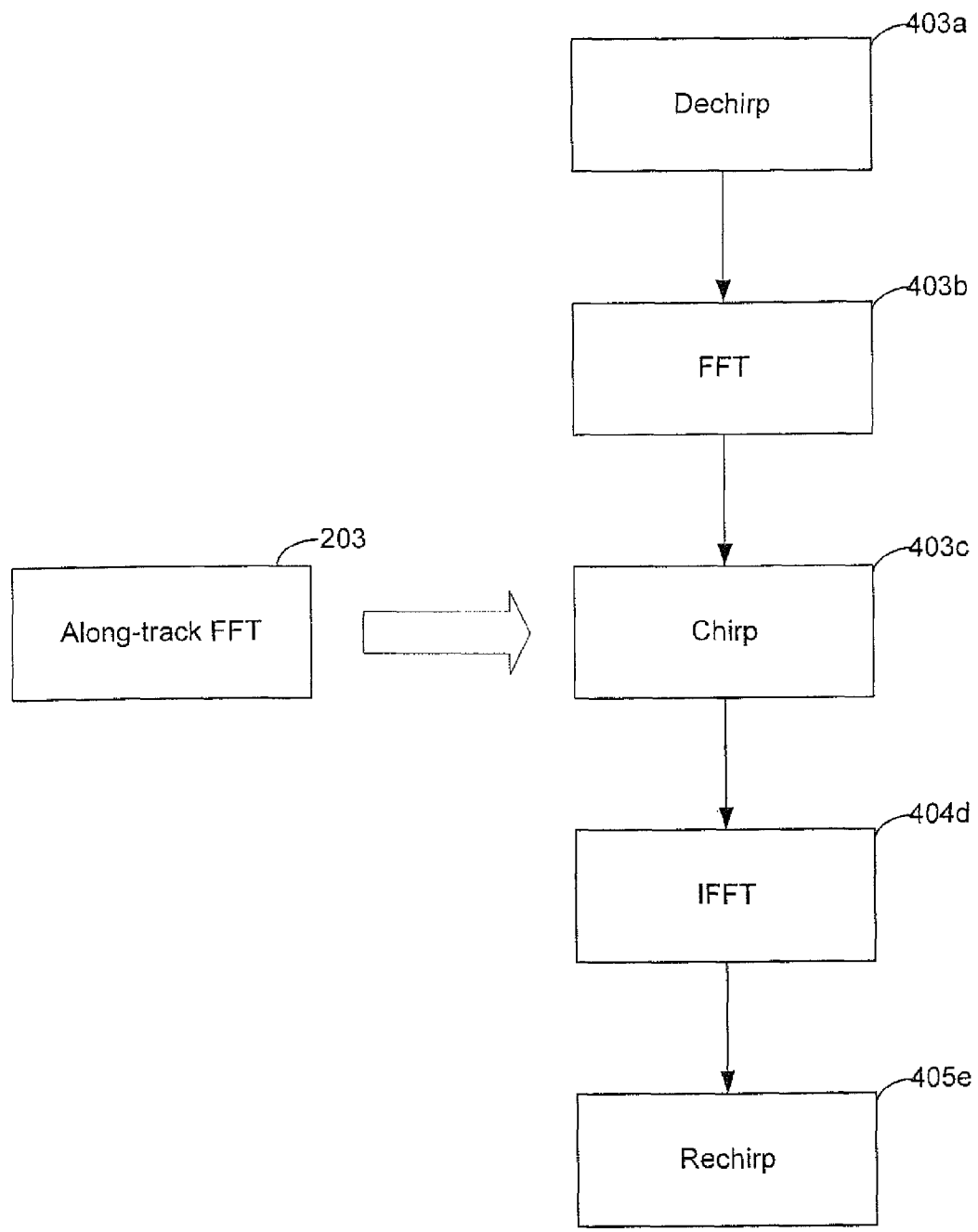
FIG. 5 illustrates a process of performing a signal transform according to an embodiment described herein.
Figure 6:
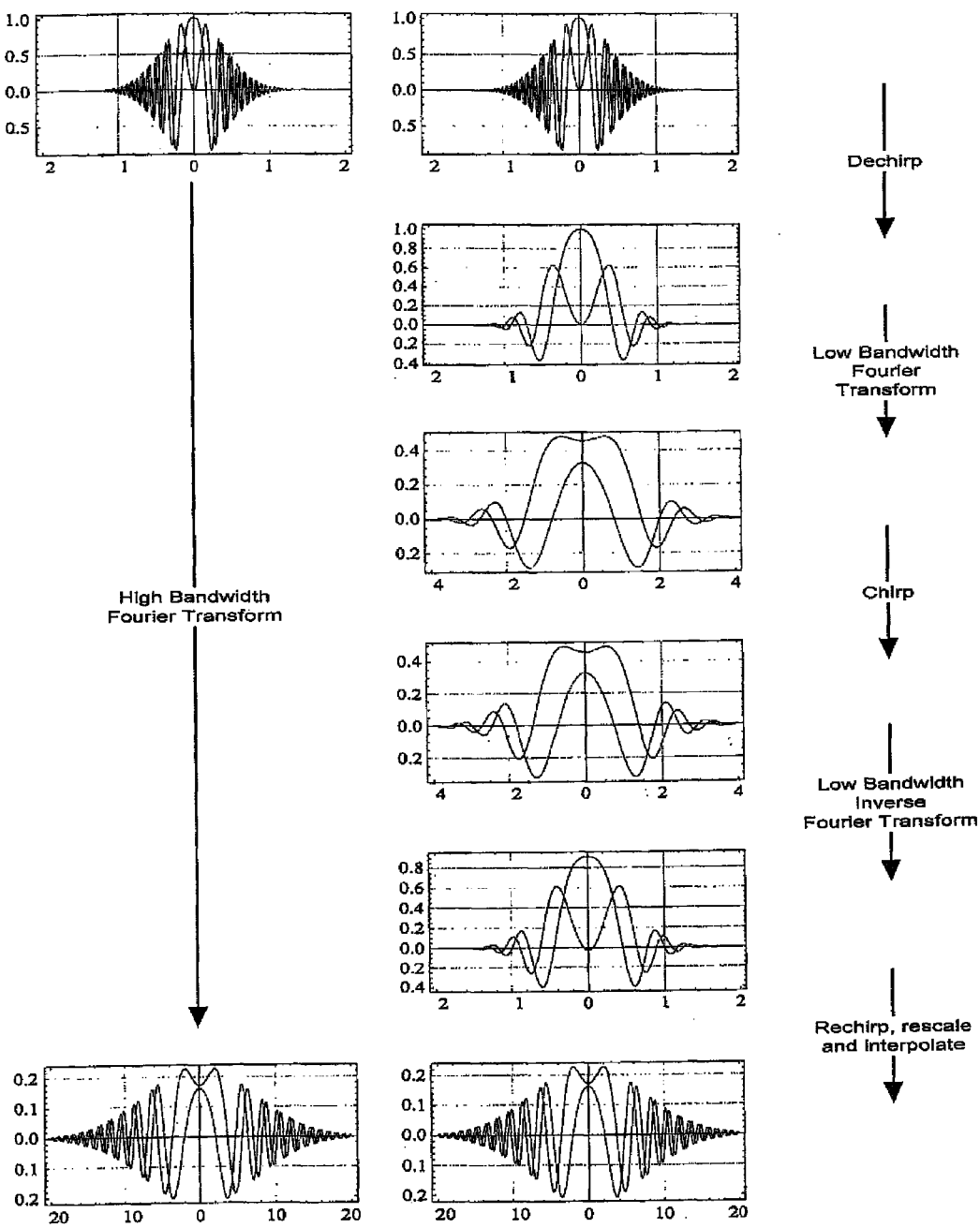
FIG. 6 illustrates signal processing of a complex signal using a conventional Fourier transform and a signal transform of an embodiment described herein.

FIG. 5 illustrates the along-track FFT 203 in a conventional RMA being replaced by a signal transform as described herein. Essentially the sequence of operations on the right-hand side of FIG. 5 provides the same result as the single Fourier transform shown on the left-hand side of FIG. 5. Examples of the real and imaginary parts of the signals at each step are illustrated in FIG. 6. Essentially, the bandwidth of the signal transform, and consequently the number of samples required, is lower than the conventional along-track FFT.

The signal transform will now be described in more detail in the forthcoming paragraphs with respect to FIGS. 5 to 7. As will be described in further detail, the signal transform transforms sampled signals to produce sampled spectra.

In the following description, a function of time g(t) is related to its Fourier transform G(f) by the following relationships:

$$g(t) = \int_{-\infty}^{\infty} G(f) \exp(i2\pi f t) df$$

$$G(f) = \int_{-\infty}^{\infty} g(t) \exp(-i2\pi f t) dt$$

The following Fourier transform pair is required:

$$\exp(-i\pi\gamma t^2) \leftrightarrow \frac{1}{\sqrt{i\gamma}} \exp\left(\frac{i\pi f^2}{\gamma}\right)$$

Figure 7:
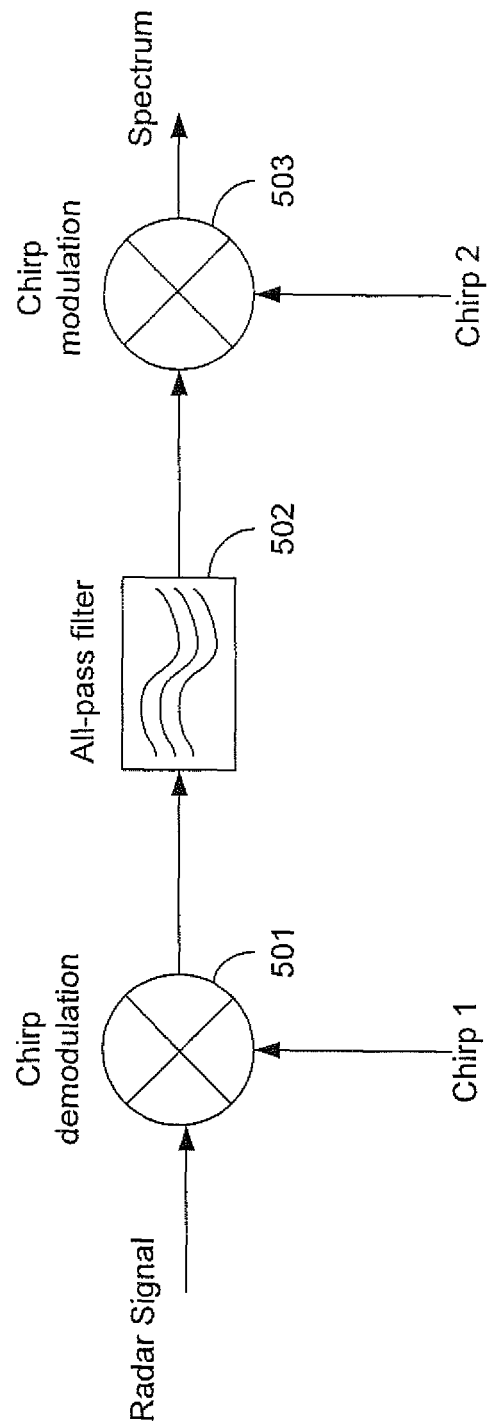
FIG. 7 illustrates a circuit diagram for implementing the signal transform of FIG. 5.

As shown in FIG. 7, the input radar signal is demodulated by a chirp waveform (chirp 1) to reduce the signal bandwidth. In this example, chirp 1 is a linear frequency modulated chirp. Essentially, the input signal $$g(t) = \int_{-\infty}^{\infty} G(f) \exp(i2\pi f t) df$$

is dechirped (multiplied by a complex signal representing a linear frequency modulated chirp) giving $$g(t)\exp(-i\pi\gamma t^2) = \int_{-\infty}^{\infty} G(f) \exp(i2\pi f t) \exp(-i\pi\gamma t^2) df$$

(see step 403a of FIG. 3).

The demodulated signal is then filtered by an all-pass quadratic phase filter 502, which introduces a delay proportional to the frequency of the demodulated signal. The constant of proportionality is the reciprocal of the chirp rate of chirp 1. As the frequency of the demodulated signal can be both positive and negative, a realisable filter needs to introduce an additional delay comparable with the duration of the original signal.

The all-pass quadratic phase filter 502 essentially performs steps 403b to 403d as depicted in FIG. 5 as follows:

The dechirped signal $$\int_{-\infty}^{\infty} G(f) \exp(i2\pi f t) \exp(-i\pi\gamma t^2) df$$

is Fourier transformed (step 403b). v is used to denote frequency in this transformed domain.

$$\int_{-\infty}^{\infty} \exp(-i2\pi v t) \left( \int_{-\infty}^{\infty} G(f) \exp(i2\pi f t) \exp(-i\pi\gamma t^2) df \right) dt =$$

$$\int_{-\infty}^{\infty} G(f) \left( \int_{-\infty}^{\infty} \exp(-i2\pi v t) \exp(i2\pi f t) \exp(-i\pi\gamma t^2) dt \right) df =$$

$$\frac{1}{\sqrt{i\gamma}} \int_{-\infty}^{\infty} G(f) \exp\left(\frac{i\pi(f-v)^2}{\gamma}\right) df$$

The transformed signal $$\frac{1}{\sqrt{i\gamma}} \int_{-\infty}^{\infty} G(f) \exp\left(\frac{i\pi(f-v)^2}{\gamma}\right) df$$

is then multiplied by a chirp exp $$\left(-\frac{i\pi v^2}{\gamma}\right)$$

to cancel the quadratic phase variation (step 403c), which can be expressed as:

$$\frac{1}{\sqrt{i\gamma}} \int_{-\infty}^{\infty} G(f) \exp\left(\frac{i\pi(f-v)^2}{\gamma}\right) \exp\left(-\frac{i\pi v^2}{\gamma}\right) df =$$

$$\frac{1}{\sqrt{i\gamma}} \int_{-\infty}^{\infty} G(f) \exp\left(\frac{i2\pi v f}{\gamma}\right) \exp\left(\frac{i\pi f^2}{\gamma}\right) df$$

In step 404d, an inverse Fourier transform is performed (from the v-domain to the τ-domain) giving:

$$\int_{-\infty}^{\infty} \left( \frac{1}{\sqrt{i\gamma}} \int_{-\infty}^{\infty} G(f) \exp\left(\frac{i2\pi v f}{\gamma}\right) \exp\left(\frac{i\pi f^2}{\gamma}\right) df \right) \exp(i2\pi v \tau) dv =$$

$$\frac{1}{\sqrt{i\gamma}} \int_{-\infty}^{\infty} G(f) \exp\left(\frac{i\pi f^2}{\gamma}\right) \left( \int_{-\infty}^{\infty} \exp\left(\frac{i2\pi v f}{\gamma}\right) \exp(i2\pi v \tau) dv \right) df =$$

$$\frac{1}{\sqrt{i\gamma}} \int_{-\infty}^{\infty} G(f) \exp\left(\frac{i\pi f^2}{\gamma}\right) \delta\left(\tau - \frac{f}{\gamma}\right) df = \frac{\gamma}{\sqrt{i\gamma}} G(\gamma\tau) \exp(i\pi\gamma\tau^2)$$

The Fourier transformed signal is then modulated with a second chirp (Chirp 2) using a frequency mixer 503 to produce a time domain output spectrum. This will increase the signal bandwidth and produce a representation (in the time-domain) of the spectrum of the original signal. Basically, the spectrum is rechirped (step 403e) by multiplying the signal $$\frac{\gamma}{\sqrt{i\gamma}} G(\gamma\tau) \exp(i\pi\gamma\tau^2)$$

by a chirp $\exp(-i\pi\gamma\tau^2)$ to give $$\frac{\gamma}{\sqrt{i\gamma}} G(\gamma\tau).$$

It is noted that chirp 2 is also a linear frequency modulated chirp having the same chirp rate as chirp 1.

Figure 8:
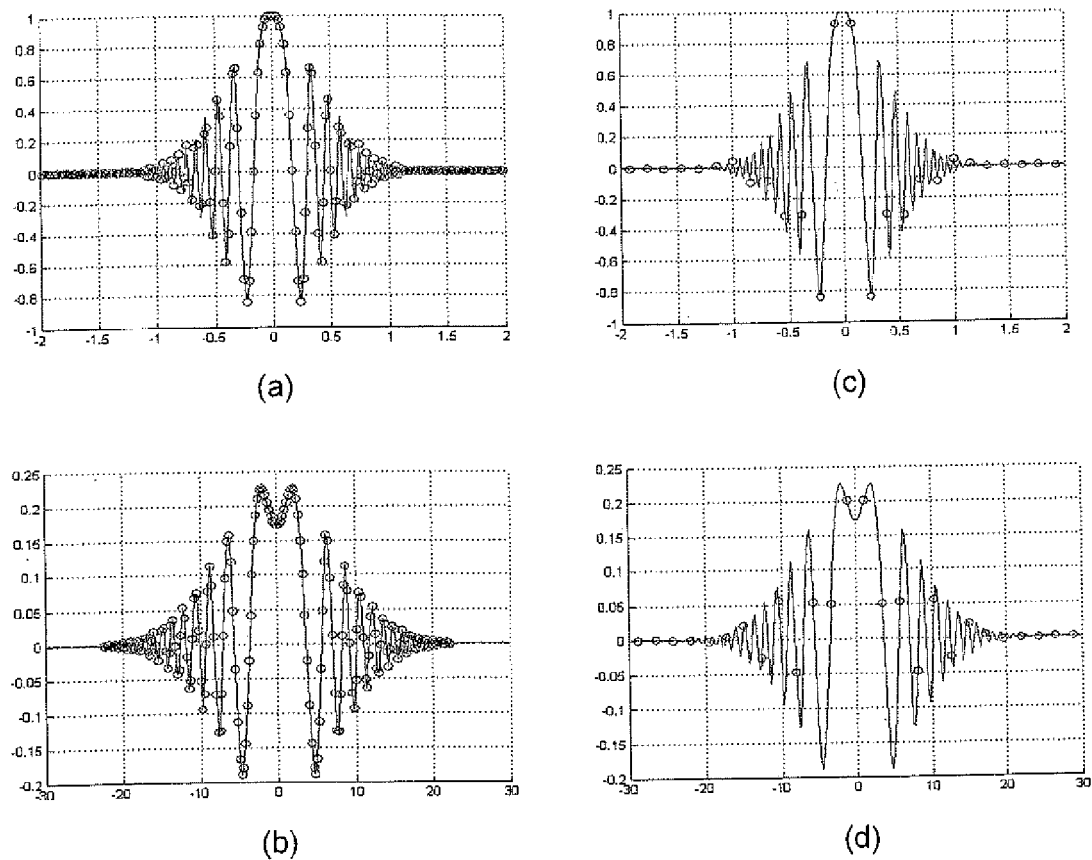
FIG. 8a illustrates a real part of a signal at a sampling rate required for a conventional FFT.
FIG. 8b illustrates a real part of a signal at a sampling rate required for the signal transform of FIG. 5.
FIG. 8c illustrates a real part of a spectrum sampled at an output of a conventional FFT.
FIG. 8d illustrates a real part of a spectrum sampled at an output of the signal transform of FIG. 5.

The key benefit of implementing the signal transform as described herein with a conventional RMA is that the bandwidth of the signal can be reduced by dechirping the input signal. This allows the sample rate of the signal to be reduced. In addition, the number of samples produced at the output is also reduced to a minimum required to reconstruct the signal spectrum. FIG. 8 illustrates the signal processing of such a signal using the described signal transform. In FIG. 8, the continuous signal and its corresponding spectrum are shown in solid lines. The input and output samples are marked with circles. As shown in FIG. 8, the number of samples used in the conventional Fourier transform is 180, whereas the number of samples required for the described signal transform is only 26. Although the number of samples used in the described signal transform is lower, it is demonstrated that the output samples are sufficient to reconstruct its spectrum.

Figure 9:
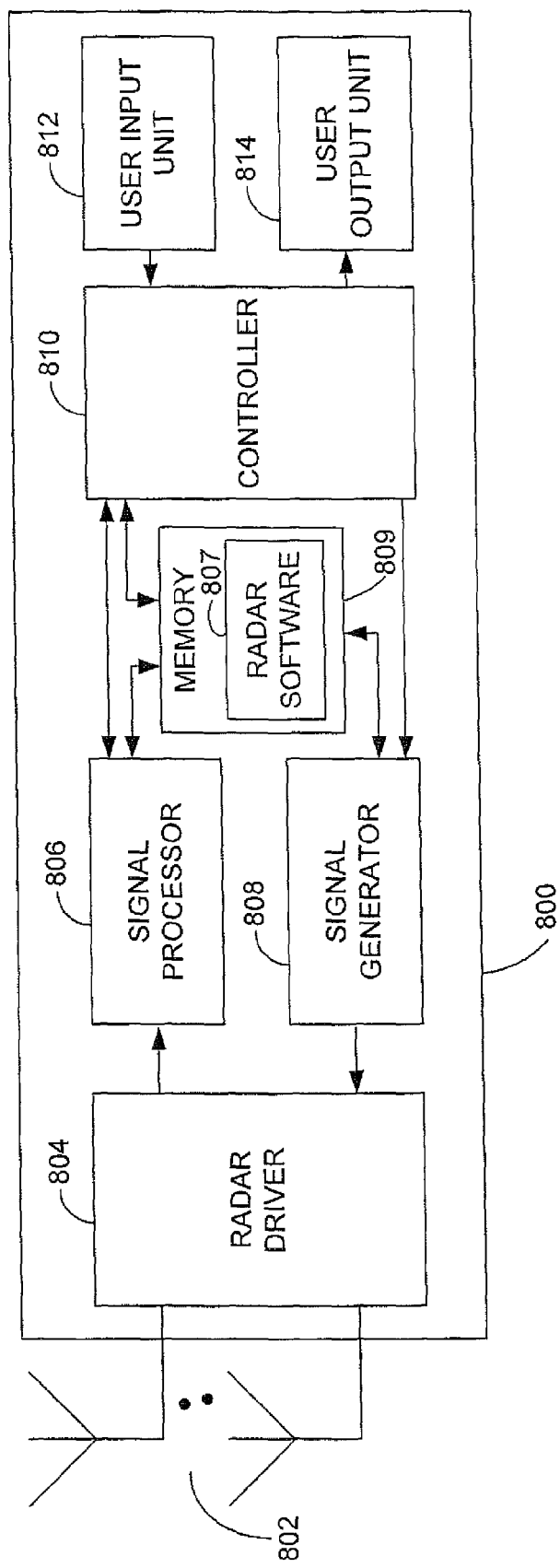
FIG. 9 illustrates an exemplary radar imaging device incorporating embodiments described herein.

Embodiments will now be described with reference to an implementation of a radar imaging device. FIG. 9 illustrates schematically hardware operably configured (by means of software or application specific hardware components) as a radar imaging device 800.

The device 800 comprises an antenna array 802, radar driver 804, a signal processor 806, a signal generator 808, a memory 807 with implemented radar software 807, a controller 810, a user input unit 812, and a user output unit 814.

The signal generator 808 is operable to generate transmission signals, which can be passed to the radar driver 804 for transmission. The antennas 802 then emit a radio frequency (RF) transmission accordingly.

The emitted RF transmission when reflected from an in-range target is received by the antennas 802, and converted into electrical signals by the radar driver 804 before being passed to the signal processor 806 for further processing. The signal processor 806 processes executable instructions corresponding with underlying software implemented processes to assemble image data from the received radar signals. The radar software 805 in accordance with the specific embodiment is stored in the working memory 809.

The controller 810 controls to the signal processor 806 according to both user input actions and the underlying software processes.

The user input unit 812 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

The controller 810 is also operable to generate display signals based on image data processed by the signal processor 806, which are then provided to the user output unit 814. The user output unit 814 can include a visual display unit, a speaker or any other device capable of presenting information to a user.

While the radar software 807 are illustrated as a distinct software element, the reader will appreciate that software can be introduced to a computer in a number of different ways. For instance, a computer program product, consisting of a storage medium could be introduced to a computer, so that stored instructions can then be transferred to the computer. Equally, a signal could be sent to the computer bearing such instructions. Furthermore, in introducing a computer program product, the reader will appreciate that a piece of software may be composed of a number of components, some of which may be new, and others of which may be assumed to be provided in the computer already. For instance, a computer might be reasonably assumed to be supplied with an operating system of known type, and a computer program may be developed on the basis of the presence of such an operating system. Thus, any computer program product may be developed as a new, stand-alone product, or as a plug-in to existing products.

While certain embodiments have been described, these embodiments have been presented by way of example only, and are not intended to limit the scope of the inventions. Indeed, the novel apparatus, systems and methods described herein may be embodied in a variety of other forms; furthermore, various omissions, substitutions and changes in the form of the apparatus, systems and methods described herein may be made without departing from the spirit of the inventions. The accompanying claims and their equivalents are intended to cover such forms or modifications as would fall within the scope and spirit of the inventions.

The invention claimed is:

1. A signal processor for performing an input signal transform of a signal, the signal processor comprising:
   a signal demodulator for demodulating said input signal by a first chirp signal having a first chirp rate to obtain a reduced bandwidth signal;
   an all-pass quadratic phase filter for filtering the demodulated reduced bandwidth signal to introduce a delay proportional to a frequency of said demodulated reduced bandwidth signal, wherein a constant of proportionality is the reciprocal of the first chirp rate; and
   a signal modulator for modulating said filtered signal from the all-pass quadratic phase filter by a second chirp signal having a second chirp rate to obtain an increased bandwidth chirped signal, the second chirp rate chosen to provide an output representing a time domain spectrum of said input signal,
   wherein each of said first chirp signal and said second chirp signal is a complex signal representing a linear frequency modulated chirp.

2. The signal processor according to claim 1, wherein said all-pass quadratic phase filter is configured to transform, via a Fourier transform, the demodulated reduced bandwidth signal into a frequency spectrum.

3. The signal processor according to claim 2, wherein said all-pass quadratic phase filter further includes a further signal modulator for modulating said frequency spectrum and generating a further modulated output signal.

4. The signal processor according to claim 3, wherein said all-pass quadratic phase filter is further configured to generate, via an inverse Fourier transform, an inverse Fourier transform of said further modulated output signal.

5. A radar system for acquiring a synthetic aperture image, said radar system comprising:
   a receiver for receiving an input radar signal including a two-dimensional array of data comprising down-range data and along-track data, wherein said along-track data includes at least one along-track chirp signal;
   a processor for processing said received radar signal, said processor includes a signal processor including
   a signal demodulator for demodulating said input signal by a first chirp signal having a first chirp rate to obtain a reduced bandwidth signal;
   an all-pass quadratic phase filter for filtering the demodulated reduced bandwidth signal to introduce a delay proportional to a frequency of said demodulated reduced bandwidth signal, wherein a constant of proportionality is the reciprocal of the first chirp rate; and
   a signal modulator for modulating said filtered signal from the all-pass quadratic phase filter by a second chirp signal having a second chirp rate to obtain an increased bandwidth chirped signal, the second chirp rate chosen to provide an output representing a time domain spectrum of said input signal,
wherein each of said first chirp signal and said second chirp signal is a complex signal representing a linear frequency modulated chirp;
a signal bandwidth reduction reducer for reducing the bandwidths of said down-range frequency spectra data and said along-track frequency spectra data;
a Stolt interpolator for interpolating said reduced bandwidth frequency spectra data to generate interpolated data, and
wherein said processor is further operable to perform a two-dimensional inverse Fourier transformation of the interpolated data to generate an output image.

6. The radar system according to claim 5, wherein said all-pass quadratic phase filter is configured to transform, via a Fourier transform, the demodulated reduced bandwidth signal into a frequency spectrum.

7. The radar system according to claim 5, wherein said all-pass quadratic phase filter further includes a further signal modulator for modulating said frequency spectrum and generating a further modulated output signal.

8. The radar system according to claim 5, wherein said all-pass quadratic phase filter is further configured to generate an inverse Fourier transform of said further modulated output signal.

9. The radar system according to claim 5, wherein the Stolt interpolator is configured to interpolate said reduced bandwidth frequency spectra data to generate the interpolated data including down-range data and along-track data for the two-dimensional inverse Fourier transformation.

10. A method of performing a signal transform of an input signal, the method comprising:
demodulating, in a signal demodulator, said input signal by a first chirp signal having a first chirp rate to obtain a reduced bandwidth signal;
filtering the demodulated reduced bandwidth signal in an all-pass quadratic phase filter to introduce a delay proportional to a frequency of said demodulated signal, wherein a constant of proportionality is the reciprocal of the first chirp rate; and
modulating in a signal modulator said filtered signal received from the all-pass quadratic phase filter by a second chirp signal having a second chirp rate to obtain an increased bandwidth chirped signal, the second chirp rate chosen to provide an output representing a time domain spectrum of said input signal,
wherein each of said first chirp signal and said second chirp signal is a complex signal representing a linear frequency modulated chirp.

11. The method according to claim 10, wherein said step of filtering includes performing a Fourier transform to transform the demodulated reduced bandwidth signal into a frequency spectrum.

12. The method according to claim 11, wherein said step of filtering further includes modulating said frequency spectrum to generate a further modulated output signal.

13. The method according to claim 12, wherein said step of filtering further includes performing an inverse Fourier transform to generating an inverse Fourier transform of said further modulated output signal.

14. A method of acquiring a synthetic aperture image, said method system comprising:
receiving an input radar signal including a two-dimensional array of data comprising down-range data and along-track data, wherein said along-track data includes at least one along-track chirp signal;
processing said received radar signal by:
demodulating, in a signal demodulator, said input signal by a first chirp signal having a first chirp rate to obtain a reduced bandwidth signal;
filtering the demodulated reduced bandwidth signal in an all-pass quadratic phase filter to introduce a delay proportional to a frequency of said demodulated signal, wherein a constant of proportionality is the reciprocal of the first chirp rate;
modulating in a signal modulator said filtered signal received from the all-pass quadratic phase filter by a second chirp signal having a second chirp rate to obtain an increased bandwidth chirped signal, the second chirp rate chosen to provide an output representing a time domain spectrum of said input signal; and
wherein each of said first chirp signal and said second chirp signal is a complex signal representing a linear frequency modulated chirp;
reducing the bandwidths of said down-range frequency spectra data and said along-track frequency spectra data;
interpolating said reduced bandwidth frequency spectra data to generate interpolated data; and
performing a two-dimensional inverse Fourier transformation of the interpolated data to generate an output image.

15. The method according to claim 14, wherein said step of filtering includes performing a Fourier transform to transform the demodulated reduced bandwidth signal into a frequency spectrum.

16. The method according to claim 14, wherein said step of filtering further includes modulating said frequency spectrum to generate a further modulated output signal.

17. The method according to claim 14, wherein said step of filtering further includes performing an inverse Fourier transform to generate an inverse Fourier transform of said further modulated output signal.

18. The method according to claim 14, wherein the interpolated data includes down-range data and along-track data for the two-dimensional inverse Fourier transformation.

* * * * *